United States Patent [19]
Asmus et al.

[11] 3,977,241
[45] Aug. 31, 1976

[54] ACTUATOR UNIT FOR VEHICLE BRAKE TESTING

[75] Inventors: Carl Junior Asmus; Woodrow Christman Wickersham, both of Temple City, Calif.

[73] Assignee: Clayton Manufacturing Company, El Monte, Calif.

[22] Filed: Apr. 11, 1975

[21] Appl. No.: 567,286

[52] U.S. Cl. ............................................ 73/132
[51] Int. Cl.² ...................................... G01L 5/28
[58] Field of Search ............ 73/129, 132, 126, 117; 74/512, 514; 254/DIG. 5

[56] References Cited
UNITED STATES PATENTS

| | | | |
|---|---|---|---|
| 3,465,577 | 9/1969 | Donovan .................. | 73/132 UX |
| 3,662,593 | 5/1972 | Pirrello et al. ............. | 73/132 |
| 3,713,332 | 1/1973 | Herrbrich ................. | 73/132 X |

*Primary Examiner*—Jerry W. Myracle
*Attorney, Agent, or Firm*—Jackson & Jones Law Corporation

[57] ABSTRACT

A portable vehicle testing unit which can be placed on the floor of the driver's compartment of any vehicle to be tested and which can be adjusted to the toeboard of the vehicle in such a way that a fluid pressure actuator mounted on the testing unit is almost in engagement with a vehicle control member, such as the brake pedal or accelerator treadle, so that the fluid pressure actuator will immediately move the control member upon build up of fluid pressure in the actuator. A feature of the design permits measuring the reaction force of the pedal (or treadle) against the fluid pressure actuator during the actuating stroke of the vehicle control member.

9 Claims, 7 Drawing Figures

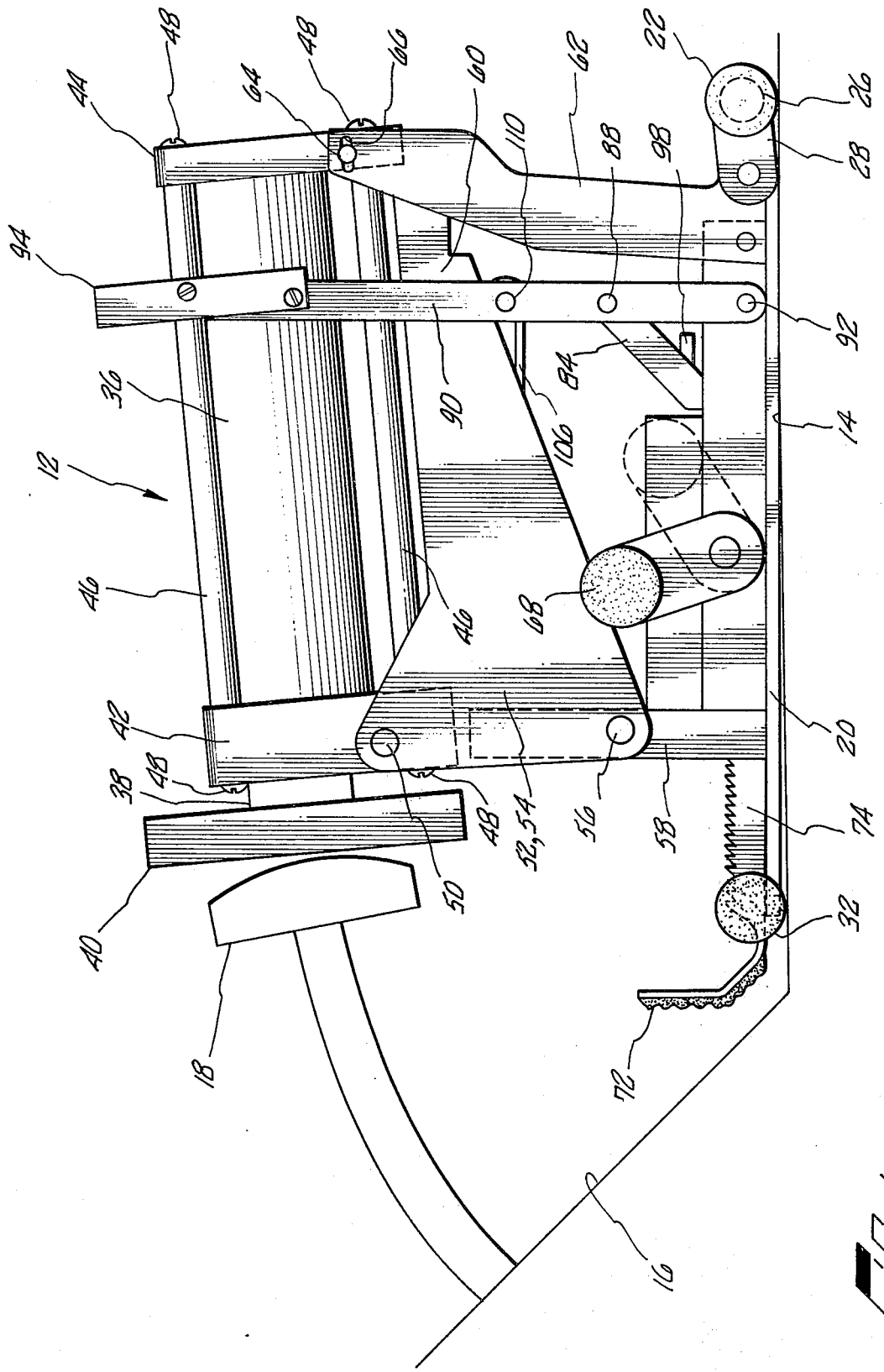

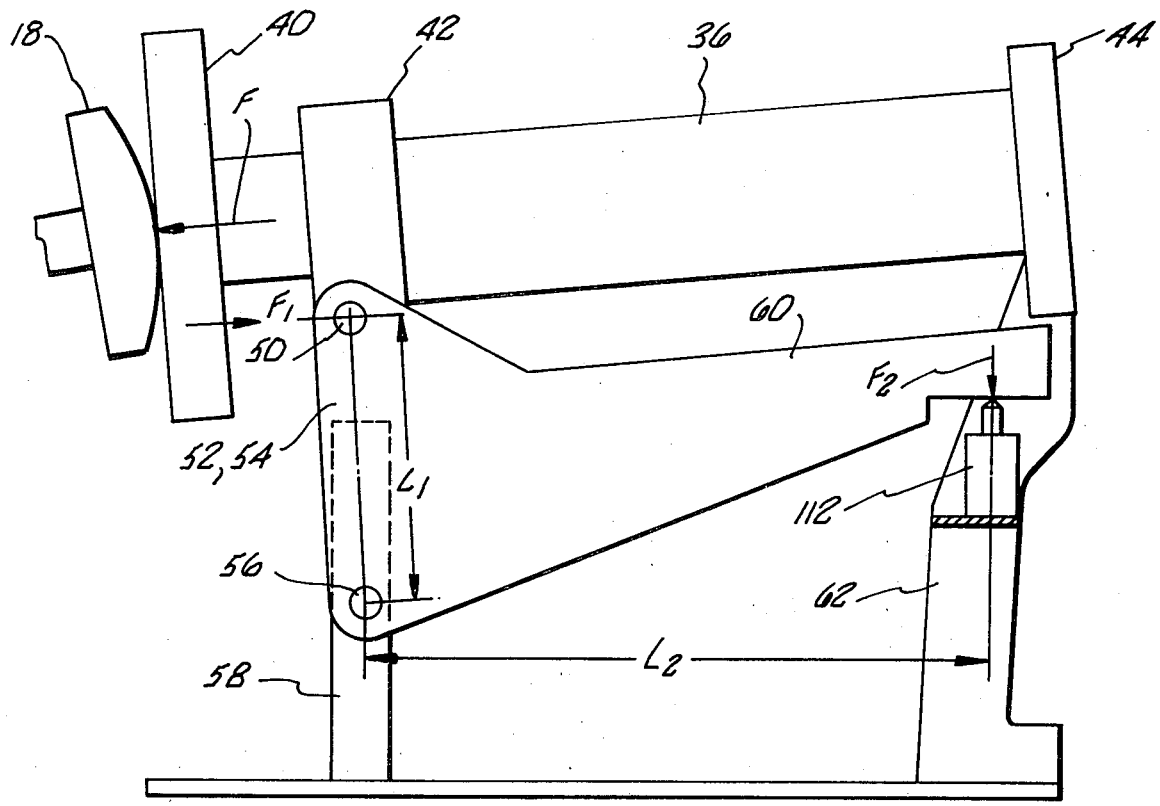
FIG_1_
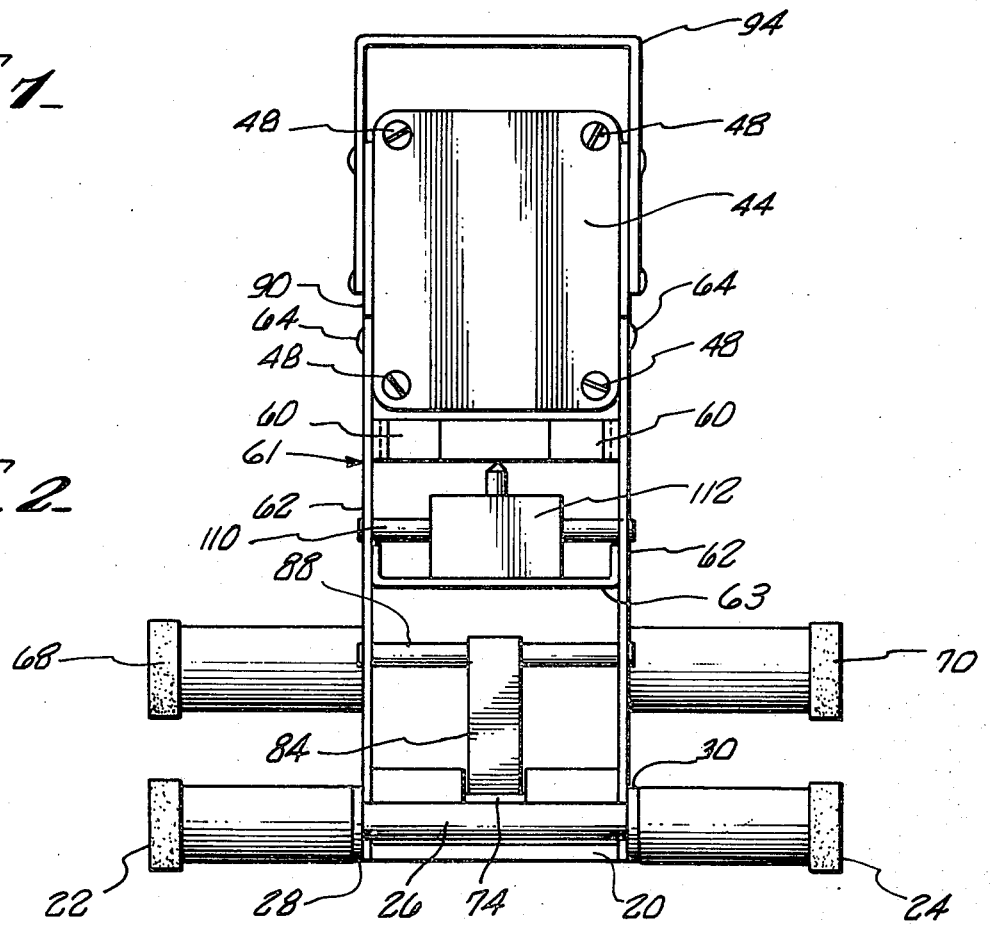
FIG_2_

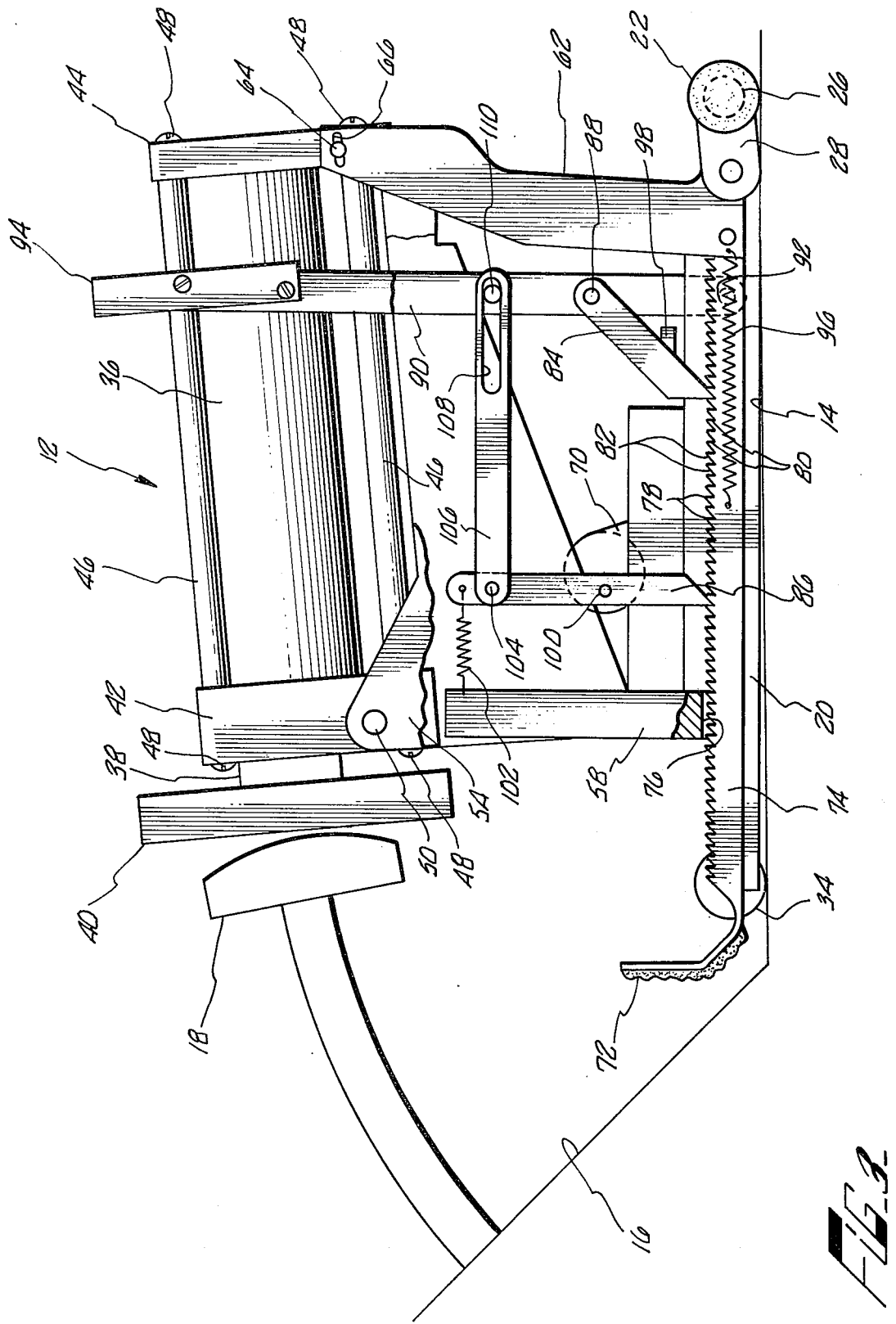

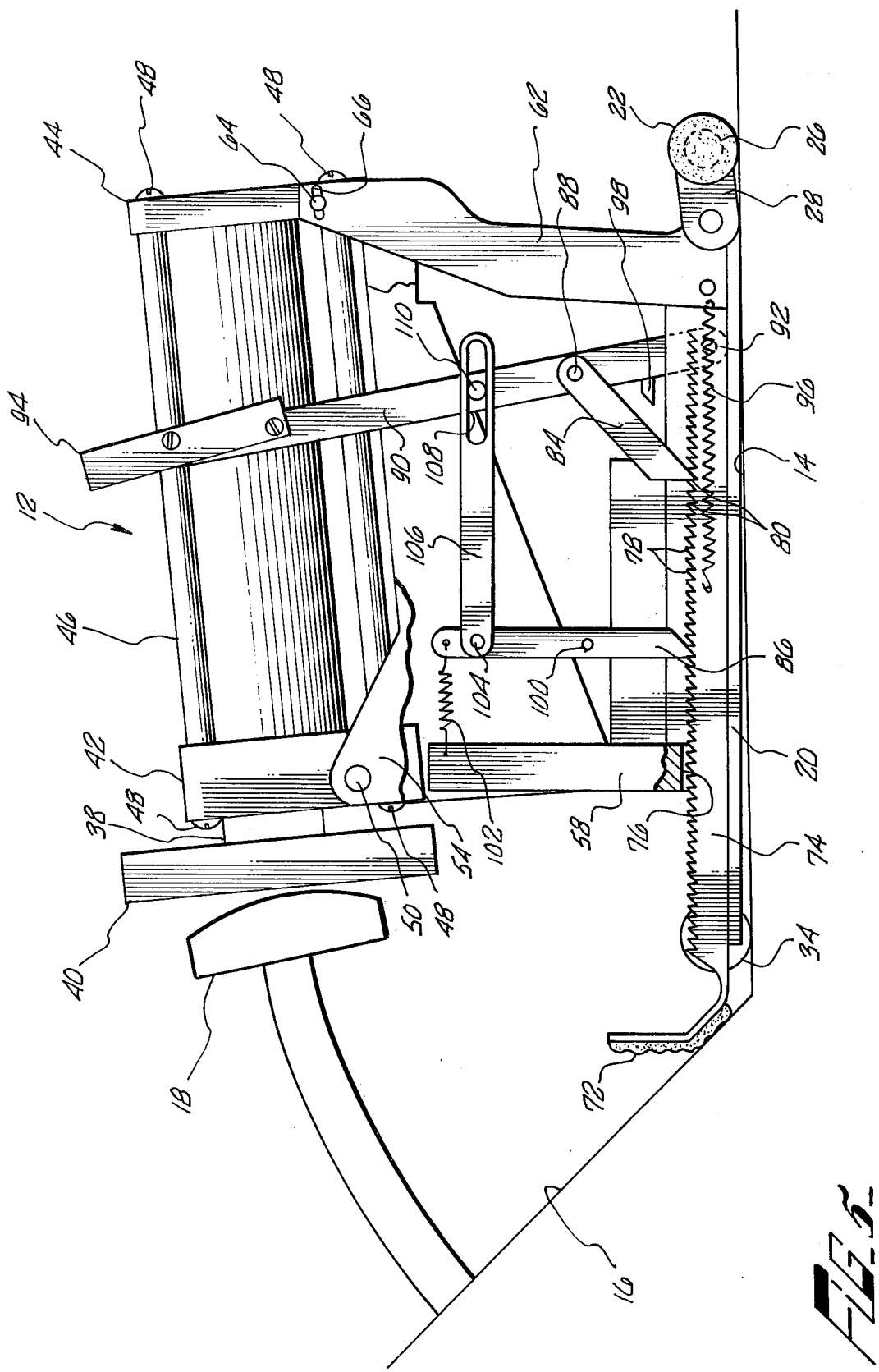

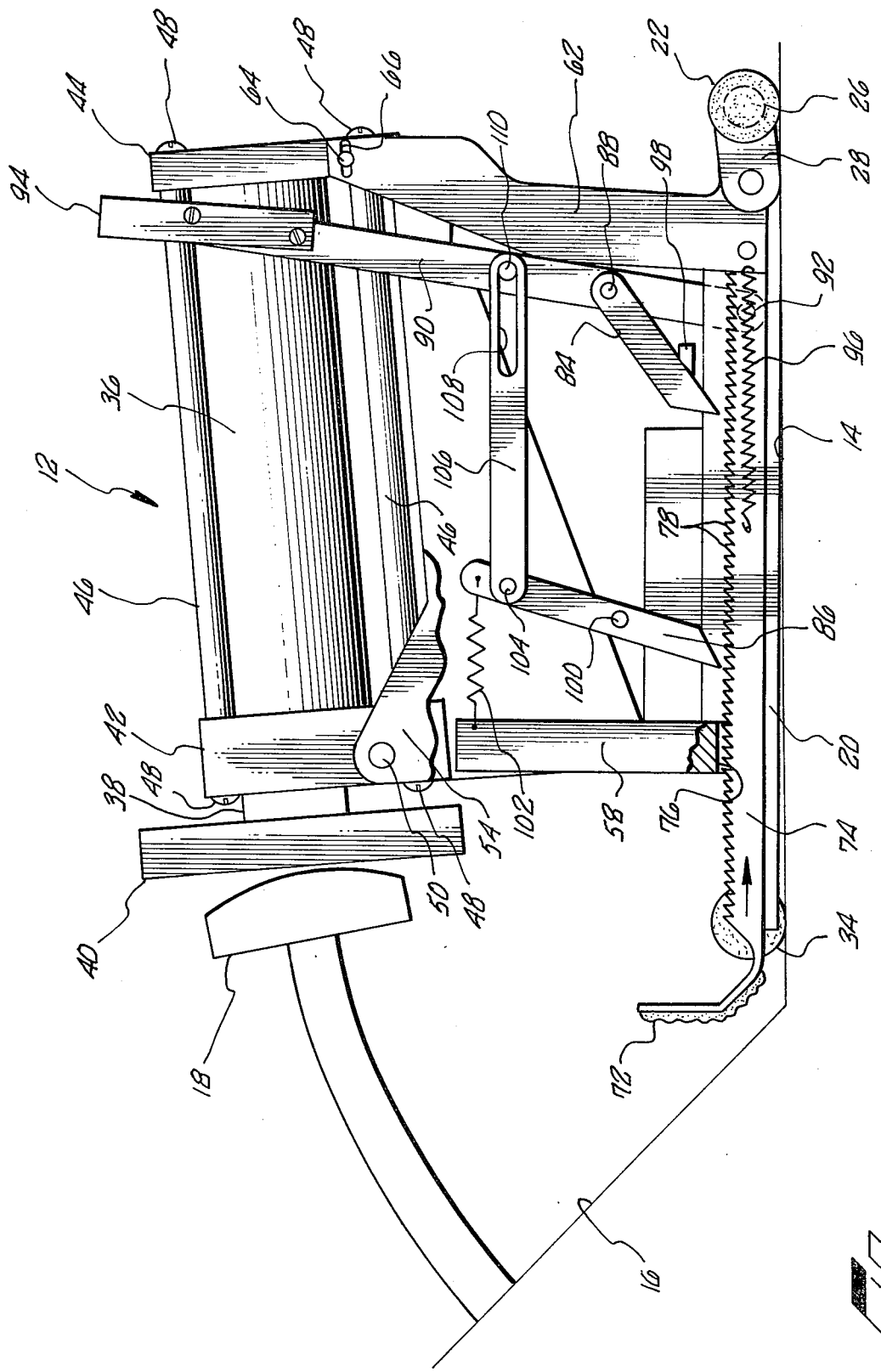

ACTUATOR UNIT FOR VEHICLE BRAKE TESTING

BACKGROUND OF THE INVENTION

A major advance in the mass testing of automotive vehicle brakes is disclosed in a series of previously filed applications assigned to the assignee of this application. In the Cline, U.S. Pat. No. 3,899,916 issued Aug. 19, 1975, relating to "Recorder and Computer Type Brake Analyzer and Method," a complete brake testing system is described in which a series of accurately controlled brake tests are systematically performed to provide brake performance data which is then evaluated by a computer to determine whether the brakes are malfunctioning. In the Clayton, Sr. et al., U.S. Pat. No. 3,877,299 issued Apr. 15, 1975, relating to "Brake Pedal Actuator," a removable brake pedal actuator is disclosed which is placed on the vehicle floorboard and which uses a differential air pressure power unit to apply force to the brake pedal until a predetermined level of brake effort is reached, manual force applied by the operator being utilized to provide a reference force, or reaction point, which holds the brake pedal actuator in position. In recently filed Asmus and Wickersham application relating to "Brake Testing Apparatus and Method Incorporating Hydraulic Position-Sensitive Subsystem," a hydraulic sybsystem for the brake testing apparatus is disclosed which functions as a stroke-limiting memory unit and as a position-holding means during the brake test sequence.

The present invention relates to an actuator unit for moving a pedal or treadle during testing, which actuator unit provides significant improvements over the one disclosed in U.S. Pat. No. 3,877,299, and which has been developed to solve problems identified as a result of experience gained in working with the earlier unit.

Two of the primary goals in any mass vehicle testing apparatus are: (a) universal applicability to the wide variety of designs of vehicles and their control systems, and (b) maximum testing speed, including both time of testing a given vehicle and, perhaps more importantly, time of transferring the testing apparatus from one vehicle to the next. It is the furtherance of these goals on which the present invention is primarily focused.

In the operation of the earlier systems, difficulty has been encountered in adjusting the portable actuator units to all makes of vehicles. Also in a brake testing sequence wherein the two front brakes are tested separately from the two rear brakes, in order to permit the driver to move the vehicle from front testing position to rear testing position, it has generally been necessary to remove the portable actuator unit from the vehicle after the testing of the front brakes, or to include a special brake control mechanism operative while the vehicle is being moved. This has been true because the brake pedal has not usually been accessible to the driver with the portable actuator unit in testing position.

SUMMARY OF THE INVENTION

In accordance with the present invention, the portable actuator unit rests on the generally horizontal portion of the vehicle floorboard. An adjustable extension is movable, under manual control, forward from the actuator unit frame until it engages the toeboard after the actuator has been properly located relative to the pedal or treadle which is to be moved during the testing cycle.

The portion of the portable actuator unit which is aligned with the pedal (or treadle) is kept to the smallest requisite cross-sectional area by locating close to the floorboard the arms which are engaged by the vehicle driver's feet during the test. With this construction, in the large majority of vehicles, the pedal (or treadle) is not entirely covered by the portable actuator unit, and can be reached by the driver's foot when the vehicle is ready to be moved from front testing position to rear testing position. In other vehicles having a very narrow pedal, it may be necessary to move the portable actuator unit laterally on the floorboard to permit driving the vehicle from front testing position to rear testing position.

In the preferred embodiment, the mechanism operatively connecting the adjustable toeboard-contacting extension to the manual member which controls the position of the extension incorporates a pawl and ratchet combination which moves the extension rapidly toward the toeboard under control of the manual member, automatically locks the extension in the test-performing forward position, and then under control of the manual member quickly releases the extension and permits its automatic return to its retracted position.

Another feature of the design is the use of the actuator housing to transfer reaction from the pedal to a force measuring device, such as a compression-type transducer, an arrangement which reduces the fore-to-aft space required by the portable actuator unit.

BRIEF DESCRIPTION OF THE DRAWINGS

FIG. 1 is a side elevation of our portable actuator unit mounted in a vehicle driver's compartment in position to control a brake-testing stroke of the brake pedal;

FIG. 2 is a rear elevation of the structure shown in FIG. 1;

FIG. 3 is a side elevation similar to FIG. 1, but partly in section to show in detail the mechanism for moving and locking the adjustable extension which is adapted to engage the toeboard;

FIG. 5 is a view similar to FIGS. 3 and 4 in which the adjustable extension is locked in its forward position wherein it engages the toeboard;

FIG. 6 is a view similar to FIGS. 3, 4 and 5 in which the mechanism is shown in the position in which the adjustable extension is released for automatic, spring-induced return to its original retracted position; and FIG. 7 is a side elevation, partly in section, showing the pedal reaction measuring linkage.

DETAILED DESCRIPTION OF THE PREFERRED EMBODIMENTS

Figure 4:
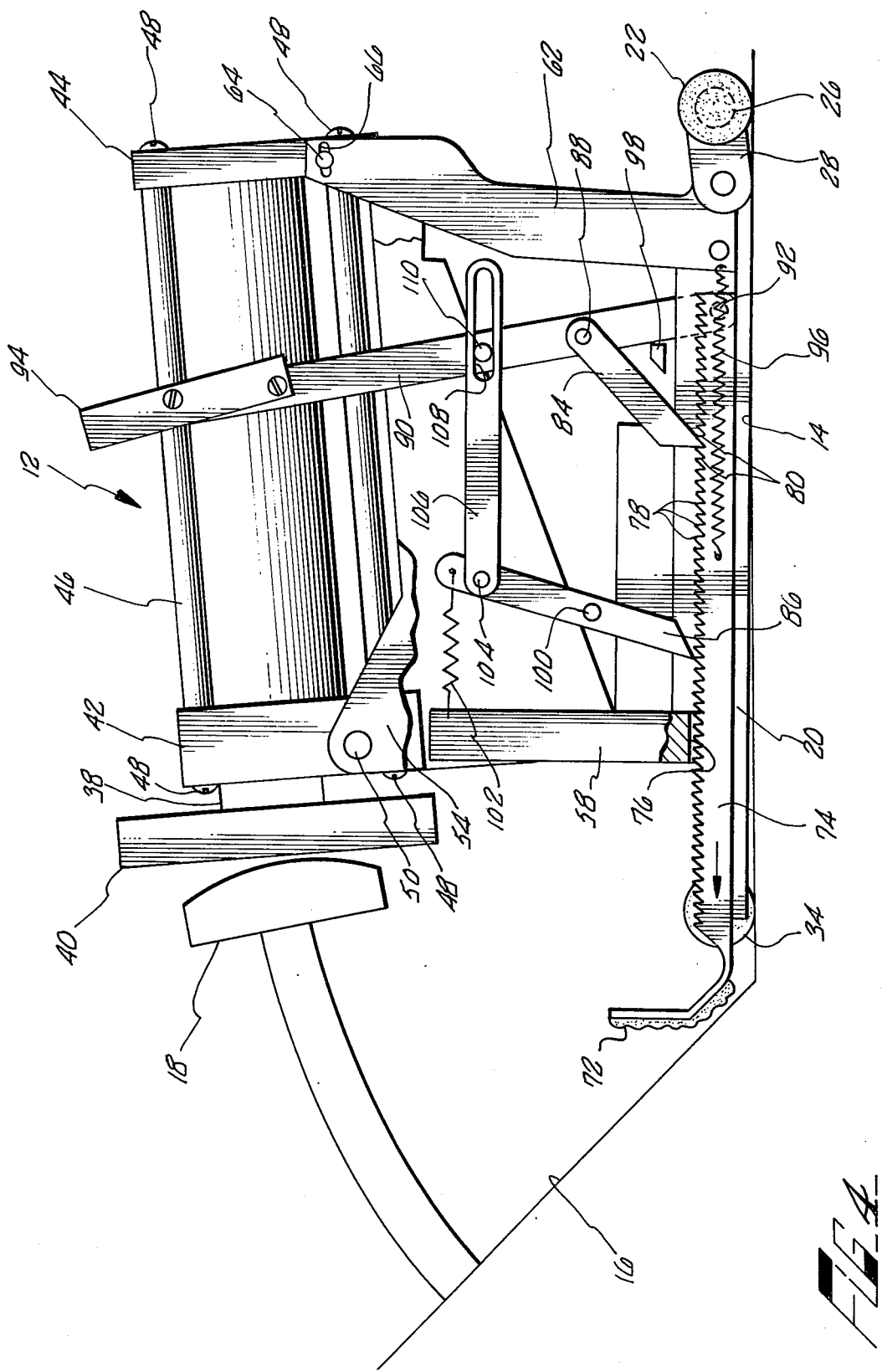
FIG. 4 is a view similar to FIG. 3 in which the adjustable extension is shown in a forward position, with the moving and locking mechanism in the position for forward movement.

FIGS. 1 and 2 show our portable actuator unit mounted in the driver's compartment of a vehicle. The actuator unit is generally indicated by the numeral 12. The horizontal portion of the vehicle floorboard is shown at 14, the sloping toeboard portion of the vehicle floorboard at 16, and the brake pedal of the vehicle at 18. There is no reason why our portable actuator unit cannot be used in testing vehicle control systems other than the brake system, but its primary present purpose is for the testing of vehicle brake systems.

The frame of the portable actuator unit has a horizontally extending base 20, which may rest directly on the horizontal portion 14 of the floorboard, or may be supported by feet which engage the floorboard. Preferably, four such feet are mounted on the unit 12. Two feet 22 and 24 are located at the rear of the unit, and are interconnected by a rod 26 which may be pivotally connected to the frame of the actuator unit by two arms 28 and 30. This arrangement permits the feet 22 and 24 to be located either in the position shown, in which the rear of the actuator frame rests directly on the floorboard, or in a position in which the rod 26 is underneath the frame and supports it in a position raised somewhat above the floorboard. The two positions permit some adjustment to adapt to different vehicle configurations. Two feet 32 and 34 are secured to the front end of the actuator frame to provide support at that point.

The power actuator which applies force to the pedal 18 during the actuating strokes of the brake testing sequence comprises a cylindrical housing 36 and a piston therein (not shown), which is connected by a hollow rod 38 to a pad 40 adapted to engage the brake pedal. The details of the interior construction of the power actuator are disclosed in the Asmus and Wickersham application referred to above.

The cylindrical housing 36 may be mounted for support in two mounting plates 42 and 44 located near the front and rear ends, respectively, of the cylindrical housing, and held in assembled position by a plurality of spacing tubes 46 which are internally threaded and which are secured to the mounting plates by a plurality of threaded fasteners 48.

The cylindrical housing 36 and its supporting plates could be secured directly to the frame of the actuator unit. However, for reasons which will be discussed in more detail subsequently, we prefer to connect the front mounting plate 42 of the cylinder supporting structure pivotally at 50 to a lever linkage arrangement. The lever linkage may include two similar levers 52 and 54 located on opposite sides of the portable actuator unit, and both pivotally connected at 56 to the vertical front portion 58 of the actuator unit frame and at 50 to the opposite sides of mounting plate 42. Each of the levers has a rearwardly extending arm 60 which is in engagement at the rear of the unit with a force-measuring device, such as the compression transducer shown in FIG. 7.

The rear mounting plate 44 of the supporting structure for the power cylinder housing rests on the vertical supporting structure 61 which extends upwardly from the rear portion of the frame, and which may comprise, as shown in FIG. 2, two vertically extending side-plates 62 secured to the base 20 of the frame and tied together at a higher point by a horizontally extending member 63. As shown, the member 63 also provides a support for a compression transducer 112 (referred to below).

In order to permit movement of the power cylinder housing along its axis, thereby removing any extraneous forces from the pedal reaction which is measured by the compression transducer, the supporting connection between mounting plate 44 and the frame is provided by two supporting anti-friction bearings 64 which extend from opposite sides of the mounting plate into horizontally elongated slots 66 in the rear vertical portion 61 of the frame. This provides vertical support for the rear of the power cylinder housing, but permits enough axial motion so that the lever linkage 52–54 can move in a clockwise direction during brake application.

During the brake actuating stroke caused by admission of pneumatic pressure to the chamber in the rear of cylinder 36, the portable actuator unit is held in place, against the reaction from the vehicle brake system, by foot pressure exerted by the operator of the vehicle. This is conveniently accomplished by having the operator place his feet against the two foot contact arms 68 and 70 which extend from opposite sides of the portable actuator unit. The foot contact arms 68 and 70 are preferably pivotally mounted, as shown. In the position shown in FIG. 1, counterclockwise rotation of the arms is prevented by a stop (not shown) in the frame of the actuator unit. When the foot contact arms 68 and 70 are moved clockwise to the "rest" position shown in dotted lines in the figure, they permit easier access of the driver to the vehicle controls during the period when the vehicle is being moved from front test position to rest test position.

When the portable actuator unit is being used in the vehicle, it is desirable to have the pad 40, in its retracted position, located very close to, but not touching, the brake pedal 18, as shown in FIG. 1. Since the portable actuator unit is subjected to the forward force of the operator's feet during the test, means are provided to contact the toeboard 16 (i.e. the sloping portion of the vehicle's floorboard) so the actuator will not slide forward as the operator pushes with his feet. A toeboard contact member is shown having a contact pad 72 mounted on an adjustable extension member, or rack, 74, which is supported on the base 20 of the frame of the actuator unit, and which is movable forward and rearward with respect to the frame. The adjustable extension 74 is guided between rails formed in the frame and extends through an opening 76 in the front vertical portion 58 of the frame.

After the portable actuator unit has been placed in the vehicle, the adjustable extension 74 is moved forward to bring the pad 72 into engagement with toeboard 16. When the brake testing cycle has been completed, the adjustable extension 74 is returned, or retracted, to its original position. It is therefore necessary to: (1) move the adjustable extension 74 forward, (2) lock it in position during the brake testing cycle, and then (3) retract it after the tests have been completed. Since one of the objects of our brake testing apparatus is to obtain maximum speed in shifting the actuator unit from vehicle to vehicle, thereby providing the highest possible thru-put of vehicles in a given length of time, we propose to control manually the adjusting, locking, and releasing of the adjustable extension with a mechanism which accomplishes these functions as rapidly as possible.

The adjustable extension could be moved in and out of the portable actuator unit in a number of ways: e.g., by means of a threaded arrangement. However, the mechanism shown in FIGS. 3 to 6 is preferable because of its rapid functioning under manual control. As shown in the figures referred to, the adjustable extension 74 is a rack, or ratchet, having a series of teeth 78 formed in its upper surface. Each of the teeth has a vertical rear face 80 and a sloping front face 82. The notches between the teeth are engageable by the tooth-shaped ends of both a driving pawl 84 and a locking pawl 86. The driving pawl 84 is pivotally connected at 88 to a manually operable adjusting, or positioning, member 90 which is pivotally mounted on the frame at 92. The top of the manually operable adjusting member 90 has a handle 94 which is gripped when it is desired to move it either clockwise or counterclockwise about the pivot 92. As shown in the drawings, the adjusting member includes two spaced parallel levers located at opposite sides of the frame, and the handle 94 is connected at its opposite ends to the two levers.

When the adjusting member 90 is moved counterclockwise from the position shown in FIG. 3, it exerts force through driving pawl 84 to push the extension rack 74 to the left, against the resistance of a resilient retraction means, such as a tension spring 96 secured at one end to extension rack 74 and at the other end to the vertical position 61 of the frame. When the adjusting member 90 is moved in a clockwise direction, it causes pawl 84 to be lifted out of contact with the rack teeth, owing to engagement of the back of the pawl with an abutment 98 secured to the frame. In other words, as the member 90 is moved clockwise, it pulls through pivotal connection 88 on driving pawl 84, and the pawl is rotated in a clockwise direction about pivot 88 because of its contact with the abutment 98.

The locking pawl 86 serves to hold, or lock, the extension rack 74 in its forward, or adjusted, position until member 90 is moved to release it. The locking pawl 86 is pivotally supported on the frame at 100 and is resiliently urged in a counterclockwise direction by suitable means, such as a tension spring 102 connected between pawl 86 and the front portion 58 of the frame. The pawl 86 is pivotally connected at 104 to link 106, which provides a lost motion connection with member 90, the link having a slot 108 slidable on a pin 110 mounted on member 90. Thus, leftward, or counterclockwise, movement of member 90 does not affect the position of link 106 and locking pawl 86, because pin 110 slides in slot 108.

As shown in FIG. 4, when arm 90 is moved to the left, or counterclockwise, about pivot 92, it exerts a force through driving pawl 84 which pushes extension rack 74 to the left. During this motion of the extension rack, locking pawl 86 slides over the teeth 78, rotating slightly in a clockwise direction about pivot 100 against the resistance of spring 102. As soon as leftward force on member 90 is removed, spring 96 tries to return the extension rack 74 to the right, but spring 102 pulls locking pawl 86 into the nearest tooth of the rack, thereby preventing return movement of the rack because of the locking engagement of the end of the locking pawl with the rack teeth. This locked position is shown in FIG. 5.

Since there are wide variations in vehicle interior dimensions, depending upon the makes and models of vehicles involved, the distance between the face of the brake pedal and the contact point of pad 40 against the toeboard varies greatly. It is therefore possible that several back and forth strokes of the manual adjusting member 90 may be required to move extension rack 74 far enough to the left to bring pad 72 into engagement with the toeboard. Repeated strokes may be made simply by pulling member 90 back to the right until driving pawl 84 picks up a few additional teeth, then moving member 90 to the left, then returning it again a short distance to the right, and again pushing it to the left after pawl 84 has passed over additional teeth.

When the full required leftward movement of extension rack 74 has been accomplished, the member 90 may be simply left in its center position, since the locking pawl 86 will hold the extension rack 74 locked in adjusted position.

When the tests have been completed, and it is desired to return extension rack 74 to its retracted position, the manual adjusting member 90 is moved all the way to the right, as shown in FIG. 6. This causes the driving pawl 84 to be withdrawn from the rack teeth. It also causes pin 110 to contact the right end of slot 108 in link 106, thereby pulling locking pawl 86 in a clockwise direction around pivot 100 against the force of tension spring 102. This motion pulls the tooth-engaging end of pawl 86 out of engagement with the teeth in extension rack 74. When locking pawl 86 disengages from the teeth of extension rack 74, tension spring 96 automatically pulls extension rack 74 to its retracted position, as shown in FIGS. 3 and 6.

The mechanism for measuring the force on pedal 18 is shown in FIG. 7. The force $F$ exerted by contact pad 40 against pedal 18 during a brake testing stroke creates an equal reaction force pushing back on the contact pad. As explained in the Asmus and Wickersham application, when the brake application stroke has applied the brakes to the desired extent, a valve in a hydraulic subsystem is closed to prevent further movement of the piston in power cylinder 36. The reaction force acting against contact pad 40 therefore will tend to move the power cylinder and piston combination toward the right, thereby exerting a force $F_1$ through the pivotal connection 50 tending to rotate the lever linkage 52–54 about fixed pivot 56. This tends to move the right end 60 of lever linkage 52–54 downwardly against the resistance of a compression transducer, or load cell, 112 mounted on the frame of the portable actuator unit. The force exerted on the transducer is converted in the usual way to an electrical signal which may be observed, recorded, and used for control purposes. The proportional relationship between force $F_1$ and the force $F_2$, which is measured by the compression transducer, as is follows:

$$F_1 \times L_1 = F_2 \times L_2;$$

$L_1$ being the length of the lever arm of force $F_1$ about pivot 56, and $L_2$ being the length of the lever arm of force $F_2$ about pivot 56.

From the foregoing detailed description, it should be apparent how the present invention provides the advantages and benefits discussed at the beginning of the specification. It also should be apparent that various modifications may be made in the selected mode of utilizing this invention without departing from its essential spirit and scope.

What is claimed is:

1. For use in a vehicle testing means, a portable actuator unit which may be temporarily placed in the vehicle operator's compartment, and which may be used to apply controlled force to a vehicle control member normally actuated by the vehicle operator, comprising:

a frame supportable on the generally horizontal portion of the vehicle floorboard;

an actuator supported on the frame and adapted to engage and move the vehicle control member during a testing stroke;

two operator foot-contact arms mounted on opposite sides of the frame near the horizontal floorboard to permit the operator to hold the frame in its forward position;

an adjustable extension supported on the frame and movable forward therefrom to engage the toeboard portion of the floor board, thereby preventing forward motion of the frame due to the force exerted thereon by the operator;

a manually operable member pivotally supported on the frame and arranged to move the adjustable extension either forward or backward relative to the frame; and pawl and ratchet means cooperating with the manually operable member and the adjustable extension to move the adjustable extension forward when the manually operable member is moved in one direction, automatically lock the adjustable extension in its forward position, and release the adjustable extension to permit its retraction when the manually operable member is moved in the reverse direction.

2. For use as a vehicle testing means, a portable actuator unit which may be temporarily placed in the vehicle operator's compartment, and which may be used to apply controlled force to a vehicle control member normally actuated by the vehicle operator, comprising:

a frame supportable on the generally horizontal portion of the vehicle floorboard;

an actuator supported on the frame and adapted to engage and move the vehicle control member during a testing stroke;

an adjustable extension supported on the frame and movable forward therefrom to engage the toeboard portion of the floorboard, thereby preventing forward motion of the frame due to the force exerted thereon by the operator;

means for manually moving the adjustable extension forward relative to the frame until it engages the toeboard;

means for automatically locking the adjustable extension in the toeboard-contacting position;

means for manually releasing the automatic locking means; and means for automatically returning the adjustable extension to its original position when the automatic locking means has been released.

3. For use as a vehicle testing means, a portable actuator unit which may be temporarily placed in the vehicle operator's compartment, and which may be used to apply controlled force to a vehicle control member normally actuated by the vehicle operator, comprising:

a frame supportable on the generally horizontal portion of the vehicle floorboard;

an actuator supported on the frame and adapted to engage and move the vehicle control member during a testing stroke;

an adjustable extension supported on the frame and movable forward therefrom to engage the toeboard portion of the floorboard, thereby preventing forward motion of the frame due to the force exerted thereon by the operator; and positioning mechanism on the frame operatively connected to the adjustable extension for selectively moving it into engagement with the toeboard, and returning it to its original position.

4. The combination of claim 3 wherein the positioning mechanism controls the locking of the adjustable extension in its toeboard-contacting position and its subsequent release to return to its original position.

5. The combination of claim 4 wherein the adjustable extension comprises a rack resiliently urged to retracted position, and the positioning mechanism comprises:

a manually movable lever;

a first tooth-engaging member pivotally connected to the lever and engageable with the rack teeth to move the rack toward the toeboard;

a second tooth-engaging member resiliently urged into contact with the rack teeth to prevent retractile movement of the rack; and a link providing a lost motion connection between the second tooth-engaging member and the lever to permit retractile movement of the lever beyond a certain point to cause disengagement of the second tooth-engaging member from the rack teeth.

6. The combination of claim 3 wherein the adjustable extension comprises a rack resiliently urged to retracted position; and the positioning mechanism comprises:

a manually movable lever;

a first tooth-engaging member pivotally connected to the lever and engageable with the rack teeth to move the rack toward the toeboard;

a second tooth-engaging member resiliently urged into contact with the rack teeth to prevent retractile movement of the rack; and a link providing a lost motion connection between the second tooth-engaging member and the lever to permit retractile movement of the lever beyond a certain point to cause disengagement of the second tooth-engaging member from the rack teeth.

7. For use as a vehicle testing means, a portable actuator unit which may be temporarily placed in the vehicle operator's compartment, and which may be used to apply controlled force to a vehicle control member normally actuated by the vehicle operator, comprising:

a frame supportable on the generally horizontal portion of the vehicle floorboard;

a force-measuring device supported on the frame;

a lever pivotally supported on the frame and pivotally connected at one end to the force-measuring device and;

a power actuator which is pivotally supported on the lever at one end and slidably supported on the frame at the other end, and which is adapted to engage and move the vehicle control member during a testing stroke.

8. For use as a vehicle testing means, a portable actuator unit which may be temporarily placed in the vehicle operator's compartment, and which may be used to apply controlled force to a vehicle control member normally actuated by the vehicle operator, comprising:

a frame supportable on the vehicle floorboard;

a force-measuring device supported on the frame;

a lever pivotally engaging the frame and pivotally engaging the force-measuring device; and a power actuator supported on the frame which also pivotally engages the lever, and which is adapted to engage and move the vehicle control member during a testing stroke.

9. For use as a vehicle testing means, a portable actuator unit which may be temporarily placed in the vehicle operator's compartment, and which may be used to apply controlled force to a vehicle control member normally actuated by the vehicle operator comprising:

a frame supportable on the generally horizontal portion of the vehicle floorboard;

an actuator supported on the frame and adapted to engage and move the vehicle control member during a testing stroke; and an adjustable extension supported on the frame and movable forward therefrom to engage the toeboard portion of the floorboard, thereby preventing forward motion of the frame due to the force exerted thereon by the operator.

* * * * *